United States Patent
Opitz

(10) Patent No.: US 10,027,815 B2
(45) Date of Patent: Jul. 17, 2018

(54) METHOD FOR INFORMING A TELECOMMUNICATIONS SUBSCRIBER ABROAD

(71) Applicant: DEUTSCHE TELEKOM AG, Bonn (DE)

(72) Inventor: Johannes Opitz, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/484,144

(22) Filed: Apr. 11, 2017

(65) Prior Publication Data
US 2017/0302799 A1   Oct. 19, 2017

(30) Foreign Application Priority Data
Apr. 13, 2016   (DE) .................. 10 2016 106 812

(51) Int. Cl.
*H04L 12/58* (2006.01)
*H04M 3/537* (2006.01)
*H04W 4/14* (2009.01)

(52) U.S. Cl.
CPC ............. *H04M 3/537* (2013.01); *H04W 4/14* (2013.01)

(58) Field of Classification Search
CPC ...... H04W 4/12; H04W 4/14; H04L 12/5895; H04M 3/537; H04M 3/533
See application file for complete search history.

(56) References Cited

U.S. PATENT DOCUMENTS

| | | | |
|---|---|---|---|
| 6,456,700 B1 * | 9/2002 | Malik | H04M 3/53333 |
| | | | 379/207.15 |
| 6,546,084 B1 | 4/2003 | Castagna | |
| 6,917,798 B1 | 7/2005 | Hake et al. | |
| 7,623,850 B1 | 11/2009 | Garg et al. | |
| 2001/0010499 A1 | 8/2001 | Hopkins | |
| 2002/0097848 A1 * | 7/2002 | Wesemann | G10L 15/22 |
| | | | 379/88.18 |
| 2002/0136367 A1 | 9/2002 | Elsey et al. | |
| 2004/0203620 A1 | 10/2004 | Thome et al. | |
| 2006/0002523 A1 | 1/2006 | Bettis et al. | |
| 2014/0273979 A1 | 9/2014 | Van Os et al. | |

FOREIGN PATENT DOCUMENTS

| | | |
|---|---|---|
| DE | 198 37 460 A1 | 2/2000 |
| DE | 698 32 664 T2 | 8/2006 |
| EP | 0 883 314 A2 | 12/1998 |
| WO | WO 99/39499 A2 | 8/1999 |

* cited by examiner

*Primary Examiner* — Steve D Agosta
(74) *Attorney, Agent, or Firm* — Norman B. Thot

(57) ABSTRACT

A method for informing a telecommunications subscriber in a foreign country of at least one item of information. The telecommunications subscriber is assigned to a telecommunications provider in a home country via a customer relationship. The home country has a first time zone. The foreign country has a second time zone. The at least one item of information comprises the first time zone and the second time zone and is transmitted to the telecommunications subscriber when a mailbox provided by the telecommunications provider is used. The method includes transmitting the at least one item of information to the telecommunications subscriber via a voice message, announcing the voice message via an automatic voice message, and then playing back a call stored in the mailbox.

7 Claims, 2 Drawing Sheets

METHOD FOR INFORMING A TELECOMMUNICATIONS SUBSCRIBER ABROAD

CROSS REFERENCE TO PRIOR APPLICATIONS

Priority is claimed to German Patent Application No. DE 10 2016 106 812.8, filed Apr. 13, 2016. The entire disclosure of said application is incorporated by reference herein.

FIELD

The present invention relates to a method for informing a telecommunications subscriber abroad, whereby the telecommunications subscriber is assigned to a telecommunications provider in a home country via a customer relationship, the home country has a first time zone, the foreign country has a second time zone, and whereby, when a mailbox provided by the telecommunications provider is used, at least one item of information relating to the first time zone and the second time zone is transmitted to the telecommunications subscriber.

BACKGROUND

DE 198 37 460 A1 describes, for example, a method for the real-time charging of telecommunications connections if a subscriber is in a foreign country and is therefore outside the home network. DE 198 37 460 A1 thereby describes a telecommunications connection between a terminal belonging to a telecommunications subscriber, who is abroad with the terminal, and the telecommunications provider which operates a server in the home country. So-called "roaming" thereby describes the possibility for the telecommunications subscriber to automatically receive or make calls abroad and to be able to use other mobile radio services in a foreign network.

It has previously been described in the case of roaming or is conventional practice for a time stamp of the home network of the respective telecommunications provider to generally appear when incoming calls are diverted to a mailbox and/or for the time stamp to be communicated to the telecommunications subscriber by an automatic announcement. The time stamp thereby relates to the date, and in particular, for example, to the time in the home country at which the call arrived in the mailbox.

The benefit of this information is clear for telecommunications subscribers in the time zone of the home country. The telecommunications subscriber immediately knows when the call arrived in the mailbox based on this information with the result that it is possible to easily determine what time has elapsed since the call was made and, for example, when the best time to call back the subscriber who made the mailbox recording would be. A telecommunications subscriber in a different time zone must, however, calculate this information from the time difference to the time zone of the home country.

WO 99/39499 A2 describes a method which assigns both an item of information relating to a first time zone in which the telecommunications subscriber is located and an item of information relating to a second time zone in which the caller was located to the messages stored in the mailbox. The information can be read from the time stamps of the stored messages.

At least one item of information relating to the first time zone and to the second time zone is transmitted to the telecommunications subscriber when a mailbox provided by the telecommunications provider is used.

SUMMARY

An aspect of the present invention is to provide a method for informing a telecommunications subscriber abroad in an improved manner. An aspect of the present invention in particular relates to increasing service quality by additionally informing the telecommunications subscriber abroad. An aspect of the present invention also relates to providing a telecommunications system having a server which belongs to a telecommunications provider to carry out the method of the present invention.

In an embodiment, the present invention provides a method for informing a telecommunications subscriber in a foreign country of at least one item of information. The telecommunications subscriber is assigned to a telecommunications provider in a home country via a customer relationship. The home country has a first time zone. The foreign country has a second time zone. The at least one item of information comprises the first time zone and the second time zone and is transmitted to the telecommunications subscriber when a mailbox provided by the telecommunications provider is used. The method includes transmitting the at least one item of information to the telecommunications subscriber via a voice message, announcing the voice message via an automatic voice message, and then playing back a call stored in the mailbox.

BRIEF DESCRIPTION OF THE DRAWINGS

The present invention is described in greater detail below on the basis of embodiments and of the drawings in which.

DETAILED DESCRIPTION

Figure 1:
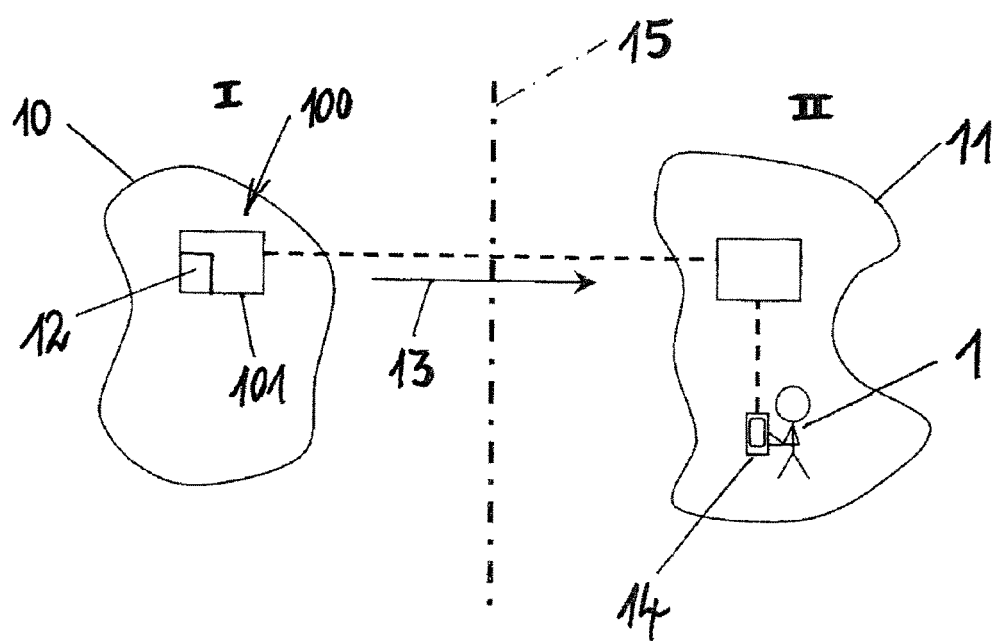
FIG. 1 shows a schematic view of roaming with a telecommunications provider in a home country and a telecommunications subscriber in a foreign country.

In an embodiment of the present invention, the method provides for at least one item of information relating to the first time zone and relating to the second time zone to be transmitted to the telecommunications subscriber when a mailbox provided by the telecommunications provider is used, the information being transmitted to the telecommunications subscriber via a voice message/announcement which is provided/announced via an automatic voice message/announcement before playing back a call stored in the mailbox.

As a result of accordingly configured servers belonging to the telecommunications providers, the servers automatically determine at what time the telecommunications subscriber is currently in what time zone. If the telecommunications subscriber calls the mailbox on the server belonging to the telecommunications provider, the telecommunications subscriber receives the information relating at least to the first time zone and the second time zone with the respective time via a voice message from which information the telecommunications provider can then derive the time at which the call arrived in the mailbox in the home country and the time at which the call arrived in the mailbox abroad. The telecommunications subscriber is therefore immediately informed, for example, of when the call arrived at the respective local time, how much time has elapsed since the call arrived in the mailbox, and when the best time for a return call/callback is. Telecommunications subscribers making a return call therefore reach their conversation partner who called the mailbox with a higher probability, the number of unsuccessful return calls is reduced and/or the probability of a successful return call is improved since the probability of success in reaching the conversation partner is increased.

The mailbox is in particular used by virtue of the telecommunications subscriber calling the mailbox from abroad. Other possible uses of the mailbox are likewise conceivable, for example, by outputting the mailbox call as a text message on the terminal belonging to the telecommunications subscriber abroad. The information could in this case additionally be displayed on the display of the terminal belonging to the telecommunications subscriber via a text message. The text message may thereby already contain the information relating to the two time zones, for example, in the form of two time stamps, with the result that the customer can immediately see the time at which the call was made from the home network.

The present invention provides that the telecommunications subscriber is informed primarily using a voice announcement with the result that the information is announced via an automatic message before actually playing back the call stored in the mailbox and played back. If the telecommunications subscriber therefore calls the mailbox from abroad, the information comprising at least the first time zone and the second time zone is first played back followed by the call stored in the mailbox being played back.

In an embodiment of the present invention, the automatic message which preceeds the message in the mailbox initially provides the message of the first time zone of the home country, with the message of the second time zone of the foreign country being provided after the message of the first time zone. A further message which outputs an additional item of information relating to a regularly preferred callback time for calling back the subscriber who made a recording in the mailbox, for example, can finally be effected after the message of the first time zone and the message of the second time zone. The preferred callback time may relate, for example, to a conventional time of day which is announced as the time in the home country and as the time abroad, with the result that both time zones for the optimum callback time are output to the telecommunications provider.

The message of the first time zone and the message of the second time zone each comprise in this case a day of the week and a respective time. The message can also be made, for example, in the language of the home country and additionally in the language of the foreign country.

In an embodiment of the present invention, the message of the further information can, for example, be used to additionally announce that the subscriber could be called back in a preferred period in his/her current foreign country, which is followed by the message of the period in the second time zone.

The present invention also provides a telecommunications system having a server belonging to a telecommunications provider for carrying out a method for informing a telecommunications subscriber abroad, the telecommunications subscriber being assigned to the telecommunications provider in a home country via a customer relationship, the home country having a first time zone, and the foreign country having a second time zone. According to the present invention, the server is designed to transmit at least one item of information relating to the first time zone and the second time zone to the telecommunications subscriber when a mailbox provided by the telecommunications provider is used. The country in which and accordingly the time zone in which the server itself is set up are thereby not relevent. The server need not be in the home country of the customer and/or of the telecommunications provider, but merely needs to be informed of the two time zones according to the present invention in order to be able to transmit corresponding information to the telecommunications subscriber via a voice message.

The service according to the present invention can be set up automatically or at the express wish of the customer. In the simplest case, the customer can turn to his/her telecommunications provider by SMS or online. The customer can also carry out the set-up process by telephone using a call center or personally in a shop. Automatic set-up which detects that the customer is in a different time zone and accordingly instructs the server is certainly particularly customer-friendly.

The further features and associated advantages which are cited above in connection with the method are likewise considered for the telecommunications system according to the present invention.

Additional features which improve the present invention are described in greater detail below together with the description of an exemplary embodiment of the present invention on the basis of the drawings.

FIG. 1 schematically shows two time zones I and II, the home country 10 being in the first time zone I, and the foreign country 11 being in the second time zone II. The two time zones I and II are schematically separated from one another by a time zone boundary 15.

The telecommunications provider 100 operates a server 101 in the home country 10, a mailbox 12 being schematically illustrated as part of the server 101.

The telecommunications subscriber 1 is in the second time zone II in the foreign country 11 and has a terminal 14 which is used by the telecommunications subscriber 1 to call the mailbox 12 of the server 101 in the home country 10 of the telecommunications provider 100 using roaming which is known per se. The connection set-up is illustrated using dashed lines.

When the mailbox 12 is used in this manner, the telecommunications subscriber 1 receives an item of information 13, which is indicated with an arrow, which is output by the server 101 to the terminal 14 belonging to the telecommunications subscriber 1 via a voice message, before playing back the call stored in the mailbox 12.

The information 13 comprises at least the information relating to the first time zone I and the information relating to the second time zone II, both time zones I and II being output via a voice message with the statement, for example, of a day of the week and a time.

Figure 2:
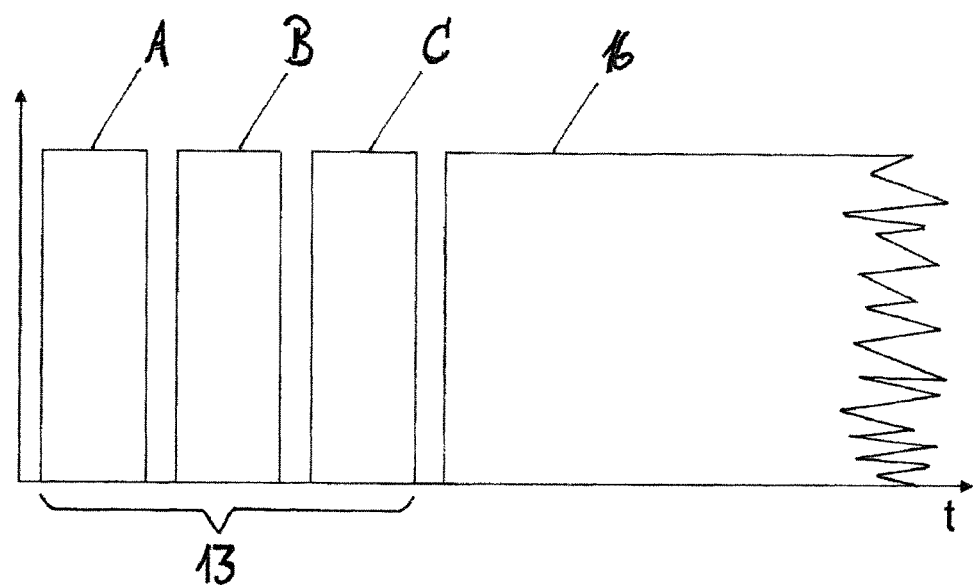
FIG. 2 shows the sequence of the message/announcement from a mailbox which is listened to by a subscriber from abroad, an item of information preceding a stored call.

FIG. 2 shows a schematic illustration of the output of the information 13 over time t, which information 13, if a call is received in the mailbox 12, precedes the playback of the stored call 16. In this case, message A relates to the playback of the first time zone I, and message B relates to the playback of the second time zone II. Message C containing further information, for example, at what current time abroad 11 relating to the second time zone II the caller can optimally be called back, is additionally output. The preferred callback time can, for example, relate to a time of from 8:00 to 20:00, the announcement being made in the local time abroad 11, with the result that the telecommunications subscriber 1 does not have to calculate back to the home time.

The present invention is not limited to embodiments described herein; reference should be had to the appended claims.

LIST OF REFERENCE SYMBOLS

100 Telecommunications provider
101 Server
1 Telecommunications subscriber
10 Home country
11 Foreign country
12 Mailbox
13 Information
14 Terminal
15 Time zone boundary
16 Stored call
A Message/announcement of the first time zone I
B Message/announcement of the second time zone II
C Message/announcement of the further information
I First time zone
II Second time zone
t Time

What is claimed is:

1. A method for informing a telecommunications subscriber in a foreign country of at least one item of information, wherein,
the telecommunications subscriber is assigned to a telecommunications provider in a home country via a customer relationship,
the home country has a first time zone,
the foreign country has a second time zone,
the at least one item of information comprises the first time zone and the second time zone and is transmitted to the telecommunications subscriber when a mailbox provided by the telecommunications provider is used, and
the at least one item of information is a recording made by a subscriber to the mailbox,
the method comprising:
transmitting the at least one item of information to the telecommunications subscriber via a voice message;
announcing the voice message via an automatic voice message;
playing back a call stored in the mailbox; and
announcing a further item of information comprising,
that the subscriber who made the recording in the mailbox via the automatic voice message could be called back in a preferred time interval in the foreign country of the telecommunication subscriber, and
a preferred callback time for calling back the subscriber who made the recording in the mailbox via the automatic voice message;
wherein,
the announcing of the further item of information that the subscriber who made the recording in the mailbox via the automatic voice message could be called back in the preferred time interval in the foreign country of the telecommunication subscriber occurs prior to the announcement of the second time zone of the foreign country.

2. The method as recited in claim 1, further comprising:
displaying the at least one item of information on a display of a terminal belonging to the telecommunications subscriber via a text message.

3. The method as recited in claim 1, wherein the automatic voice message announces the first time zone of the home country before announcing the second time zone of the foreign country.

4. The method as recited in claim 3, wherein
the announcing of the further item of information comprising the preferred callback time for calling back the subscriber who made the recording to the mailbox via the automatic voice message occurs after each of the announcement of the first time zone of the home country and the announcement of the second time zone of the foreign country.

5. The method as recited in claim 4, wherein the announcement of the further item of information comprising the preferred callback time for calling back the subscriber who made the recording to the mailbox via the automatic voice message further comprises at least one time interval comprising a first time and a second time.

6. The method as recited in claim 3, wherein the announcement of the first time zone of the home country and the announcement of the second time zone of the foreign country each comprise a respective day of the week and a respective time.

7. A telecommunications system comprising a server belonging to a telecommunications provider for carrying out a method for informing a telecommunications subscriber of at least one item of information in a foreign country,
wherein,
the telecommunications subscriber is assigned to the telecommunications provider in a home country via a customer relationship,
the home country has a first time zone,
the foreign country has a second time zone,
the at least one item of information comprises the first time zone and the second time zone and is transmitted to the telecommunications subscriber when a mailbox provided by the telecommunications provider is used, and
the at least one item of information is a recording made by a subscriber to the mailbox,
the server being configured:
to transmit, via a voice message, the at least one item of information comprising the first time zone and the second time zone to the telecommunications subscriber when the mailbox provided by the telecommunications provider is used;
to announce the voice message via an automatic voice message;
to play back a call stored in the mailbox; and
to announce a further item of information comprising,
that the subscriber who made the recording in the mailbox via the automatic voice message could be called back in a preferred time interval in the foreign country of the telecommunication subscriber, and
a preferred callback time for calling back the subscriber who made the recording in the mailbox via the automatic voice message;
wherein,
the announcing of the further item of information that the subscriber who made the recording in the mailbox via the automatic voice message could be called back in the preferred time interval in the foreign country of the telecommunication subscriber occurs prior to the announcement of the second time zone of the foreign country.

\* \* \* \* \*